US011807389B2

(12) United States Patent
Bushkov et al.

(10) Patent No.: US 11,807,389 B2
(45) Date of Patent: Nov. 7, 2023

(54) SYSTEMS AND METHODS FOR AIRCRAFT MANAGEMENT

(71) Applicant: Aermetric Technology Group, Inc., Wilmington, DE (US)

(72) Inventors: Sean Bushkov, San Francisco, CA (US); Derek Waterman, San Francisco, CA (US)

(73) Assignee: AERMETRIC TECHNOLOGY GROUP, INC., Wilmington, DE (US)

( * ) Notice: Subject to any disclaimer, the term of this patent is extended or adjusted under 35 U.S.C. 154(b) by 0 days.

(21) Appl. No.: 17/981,011

(22) Filed: Nov. 4, 2022

(65) Prior Publication Data

US 2023/0146900 A1 May 11, 2023

Related U.S. Application Data

(60) Provisional application No. 63/277,727, filed on Nov. 10, 2021.

(51) Int. Cl.
*B64D 45/00* (2006.01)
*G07C 5/00* (2006.01)
*G07C 5/08* (2006.01)

(52) U.S. Cl.
CPC ............ *B64D 45/00* (2013.01); *G07C 5/006* (2013.01); *G07C 5/0816* (2013.01); *B64D 2045/0085* (2013.01)

(58) Field of Classification Search
CPC ............ B64D 45/00; B64D 2045/0085; G07C 5/006; G07C 5/0816
See application file for complete search history.

(56) References Cited

U.S. PATENT DOCUMENTS

| 9,187,104 B2 | 11/2015 | Fang et al. |
| 10,417,614 B2 | 9/2019 | Johnson et al. |
| 10,552,802 B2 | 2/2020 | Avery et al. |

(Continued)

FOREIGN PATENT DOCUMENTS

WO  WO-2023086757 A1 * 5/2023 ............. B64D 45/00

OTHER PUBLICATIONS

Ting, S. L., W. H. Ip, and Albert HC Tsang. "Is Naive Bayes a good classifier for document classification." International Journal of Software Engineering and Its Applications 5.3 (2011): 37-46. (Year: 2011).*

(Continued)

*Primary Examiner* — Shon G Foley
(74) *Attorney, Agent, or Firm* — WILSON SONSINI GOODRICH & ROSATI

(57) ABSTRACT

In an aspect, a method for monitoring recurrent aircraft faults is disclosed. The method comprises (a) retrieving a plurality of data entries from an aircraft. The plurality of data entries may comprise semantic information about a plurality of recurrent aircraft faults. The method also comprises (b) using a trained natural language processing algorithm, establishing a plurality of pairwise relations of the plurality of data entries, a pairwise relation corresponding to a recurrent fault of the plurality of recurrent aircraft faults. The method also comprises (c) generating one or more alerts from the plurality of pairwise relations. Finally, the method comprises (d) presenting the one or more alerts in a user interface.

18 Claims, 12 Drawing Sheets

(56) References Cited

U.S. PATENT DOCUMENTS

| | | | | |
|---|---|---|---|---|
| 2001/0042229 | A1* | 11/2001 | James | G01D 3/08 |
| | | | | 714/48 |
| 2017/0358152 | A1 | 12/2017 | Atalla et al. | |
| 2018/0330557 | A1* | 11/2018 | Rivera | G07C 5/0816 |
| 2019/0100335 | A1 | 4/2019 | Huber et al. | |
| 2019/0147670 | A1* | 5/2019 | Chopra | G05B 23/0243 |
| | | | | 701/29.1 |
| 2020/0391881 | A1 | 12/2020 | Elshrif et al. | |
| 2021/0097058 | A1 | 4/2021 | Skiles et al. | |

OTHER PUBLICATIONS

D. L. C. Mack, G. Biswas, X. D. Koutsoukos and D. Mylaraswamy, "Learning Bayesian Network Structures to Augment Aircraft Diagnostic Reference Models," in IEEE Transactions on Automation Science and Engineering, vol. 14, No. 1, pp. 358-369, Jan. 2017) (Year: 2017).*

Celikmih et al. Failure prediction of aircraft equipment using machine learning with a hybrid data preparation method. Scientific Programming: pp. 1-10 (2020). https://doi.org/10.1155/2020/8616039.

Korvesis. Machine learning for predictive maintenance in aviation. Doctoral dissertation, Université Paris-Saclay. HAL archives-ouvertes: pp. 1-161 (2017).

Liu. Application Research of Deep Learning in the Field of Aircraft Fault Diagnosis. IEEE, pp. 104-108 (2019). Retrieved Mar. 25, 2023 at URL: https://ieeexplore.ieee.org/stamp/stamp.jsp?tp=&arnumber=8972999.

PCT/US2022/079312 International Search Report With Written Opinion dated Mar. 16, 2023.

\* cited by examiner

SYSTEMS AND METHODS FOR AIRCRAFT MANAGEMENT

CROSS-REFERENCE

This application claims priority to U.S. Provisional Patent Application No. 63/277,727, filed on Nov. 10, 2021, which is entirely incorporated herein by reference.

BACKGROUND

Recurring faults in aircraft may cost commercial aircraft operators millions of dollars annually, by causing flight shutdowns and flight cancellations, and may cause defense aircraft to become non-mission capable. Although many different types of aircraft may collect similar types of fault data, currently-existing methods for detecting faults may be often aircraft-specific or airline-specific. Although machine learning (ML) has been used to make predictions based on analysis of large data sets, ML systems may be complicated to deploy for aircraft systems, due to the aircraft-specific nature of data collection.

SUMMARY

There is a need for a system that can monitor faults or fault patterns affecting aircraft fleets. Such a system may analyze fault data for many different types of aircraft and detect recurring faults or patterns of faults. The present disclosure provides a system and method for detecting recurrent faults in a variety of aircraft using machine learning analysis. The disclosed system may present the recurrent faults in a user interface that is easily usable by an aircraft operator. The disclosed system may also provide for aggregation of fragmented and disparate datasets, which may include combining data items with different formats and from different sources for presentation in a user interface.

In an aspect, a method for monitoring recurrent aircraft faults is disclosed. The method comprises (a) retrieving a plurality of data entries from an aircraft, the plurality of data entries comprising semantic information about a plurality of recurrent aircraft faults. The method also comprises (b) using a trained machine learning algorithm, establishing a plurality of pairwise relations of the plurality of data entries, a pairwise relation corresponding to a recurrent fault of the plurality of recurrent aircraft faults. The method also comprises (c) generating one or more alerts from the plurality of pairwise relations. The method also comprises (d) presenting the one or more alerts in a user interface.

In some embodiments, the data entries are streaming data, data from flat files, batched files, or data from a one-time data transfer.

In some embodiments, the data entries are aircraft maintenance data or aircraft operations data.

In some embodiments, the recurrent fault occurs a particular number of times within a particular time period.

In some embodiments, the recurrent fault occurs a particular number of times within a particular number of flights.

In some embodiments, the aircraft is a passenger plane, jumbo jet, cargo plane, military plane, or government plane.

In some embodiments, an aircraft fault is a loose component, a cracked component, an elevated temperature, a malfunctioning component, an inoperative component, a missing component, or an unexpected noise.

In some embodiments, the data entries are from a maintenance log, a pilot log, or aircraft fault sensors.

In some embodiments, the machine learning algorithm may be a support vector machine, a decision tree, a neural network, or a natural language processing algorithm.

In some embodiments, the user interface is a graphical user interface. In some embodiments, the method further comprises, prior to (b), pre-processing the plurality of data entries.

In some embodiments, pre-processing the plurality of data entries comprises combining data, compressing data, or parsing data.

In some embodiments, pre-processing the plurality of data entries comprises standardizing text.

In some embodiments, text standardization comprising lemmatizing verbs, removing stop words, or subject-specific standardization.

In some embodiments, generating a pairwise relation comprises using one or more of simple word matching, text similarity calculation, encoded ATA matching, or supervised learning matching.

In an aspect, a computer-implemented method of training a machine learning model for detecting recurrent aircraft faults is disclosed. The method comprises (a) receiving data from a plurality of sources. The method may also comprise (b) applying one or more pre-processing operations to the data. The one or more pre-processing operations comprises one or more of: combining the data, compressing the data, parsing the data, or standardizing the data to create pre-processed data. The method may also comprise (c) creating a training set comprising a plurality of pairwise relations associated with the pre-processed data. The method may also comprise (d) training the machine learning model to link a pair of the plurality of pairwise relations.

In some embodiments, the data comprises a plurality of text entries.

In some embodiments, (b) further comprises using one or more machine learning algorithms to (1) replace one or more words in one or more of the text entries; or (2) identify related words in one or more of the text entries.

In an aspect, a system for monitoring recurrent aircraft faults is disclosed. The system comprises one or more computer processors individually or collectively programmed to: (a) retrieve a plurality of data entries from an aircraft, the plurality of data entries comprising semantic information about a plurality of recurrent aircraft faults; (b) use a trained machine learning algorithm, establishing a plurality of pairwise relations of the plurality of data entries, a pairwise relation corresponding to a recurrent fault of the plurality of recurrent aircraft faults; (c) generate one or more alerts from the plurality of pairwise relations; and (d) present the one or more alerts in a user interface.

In an aspect, a non-transitory computer-readable medium comprising machine-executable code that, upon execution by one or more computer processors, implements a method for monitoring recurring aircraft faults is disclosed. The method comprises (a) retrieving a plurality of data entries from an aircraft, the plurality of data entries comprising semantic information about a plurality of recurrent aircraft faults. The method also comprises (b) using a trained machine learning algorithm, establishing a plurality of pairwise relations of the plurality of data entries, a pairwise relation corresponding to a recurrent fault of the plurality of recurrent aircraft faults. The method also comprises (c) generating one or more alerts from the plurality of pairwise relations; and (d) presenting the one or more alerts in a user interface.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
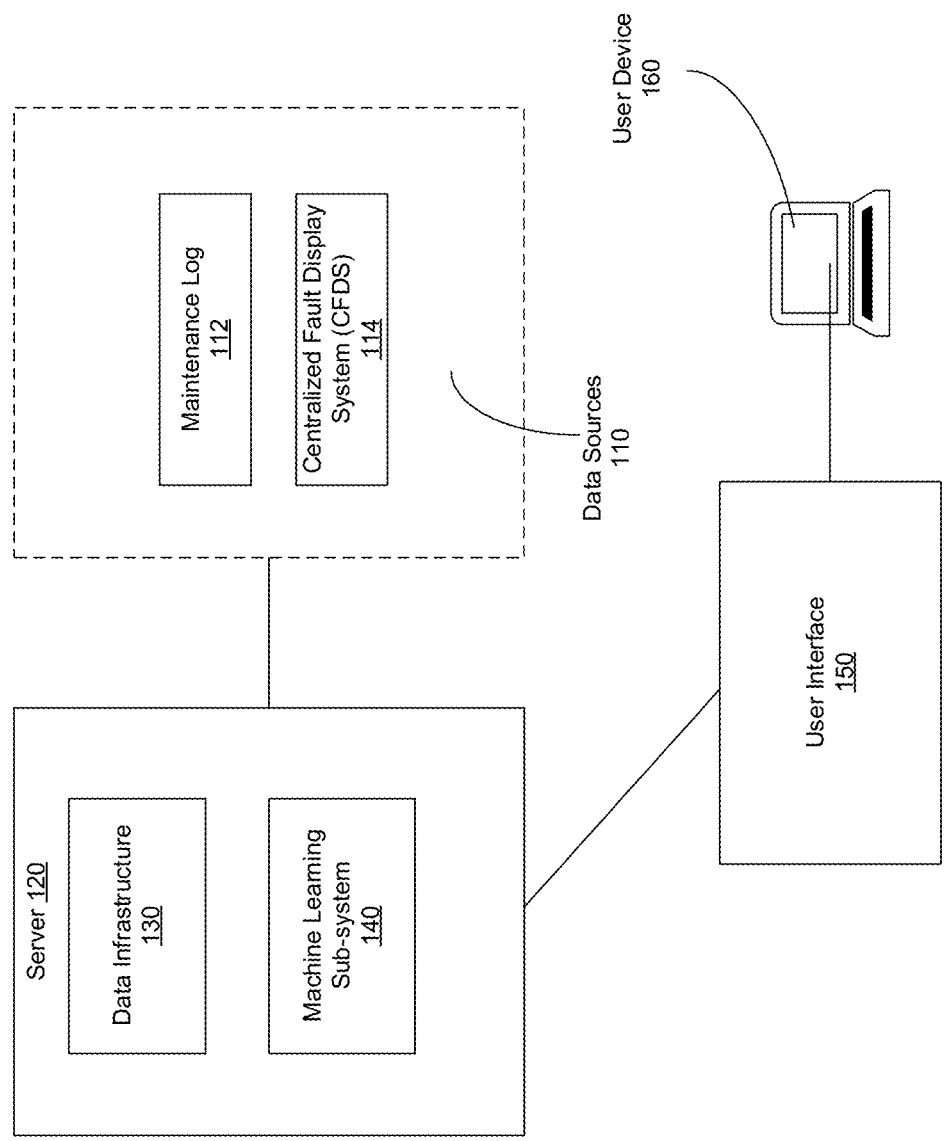
FIG. 1 illustrates a system for aggregating, processing, and displaying data from various sources, and generating recurrent faults for an aircraft operation.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Disclosed herein is a system and method for monitoring faults and fault patterns affecting aircraft fleets. A software platform may be provided to serve as an interfleet maintenance and logistics hub for technical operations, which may advantageously handle aircraft data from multiple data pipelines. The aircraft data may be streaming data, data from flat files, batched files, or one time data transfers. Aircraft data may be aircraft maintenance data, aircraft data, or aircraft operations data. The aircraft management platform may seamlessly combine the data from multiple pipelines with ancillary maintenance information in order to generate a reliable, fast-acting, and secure solution for moving data. The platform may utilize data-fidelity processes that may automatically verify, clean & correct data in real time. This may save airlines time and need for manual labor, and/or costs associated with both, and may streamline processes to vastly increase visibility into real problems.

Systems and methods provided herein may be useful for determining recurrent faults in aircraft. In some embodiments, a disclosed system may retrieve information about these recurrent faults from aircraft or airline logs or from aircraft sensor data. The system may then implement one or more machine learning algorithms to determine whether faults outlined in the logs are recurrent faults. Recurrent faults may be defined as faults that occur a particular number of times (e.g., above a threshold number of faults) during a particular time period or over a particular number of flights. For example, a recurrent fault may occur twice within ten days or twice within ten flights.

To determine whether faults are recurrent, the disclosed system may process input airline log page data or centralized fault diagnosis system (CFDS) data and use the text from these inputs (e.g., descriptions of defects) to link similar faults together. In some embodiments, the system may request data only for unscheduled tasks to generate recurring faults. In these embodiments, the system may use filtering to remove various scheduled tasks or other irrelevant work orders that may not be of interest for maintenance teams tracking recurrent issues (e.g., written work orders). This may enable predictive maintenance to be performed on aircraft and allow for maintenance planning.

Aspects of the invention may be directed to systems and methods for managing aircraft operations. An aircraft management platform may advantageously receive and process aircraft data.

Aircraft may refer to any type of flying vehicle including, but not limited to airplanes (e.g., jet or propeller aircraft), helicopters, blimps, spacecraft, gliders, airships, paramotors, or any other type of vehicle capable of flying through the air. Aircraft may include fixed-wing aircraft and/or rotor craft. In some embodiments aircraft may refer to passenger planes, jumbo jets, cargo planes, seaplanes, biplanes, military planes, government planes, or any other type of aircraft. Aircraft herein may optionally be owned and/or operated by airlines. The aircraft may be manned or unmanned (e.g., unmanned aerial vehicles (UAVs) or drones). Examples of commercial aircraft models may include Airbus 320, Boeing 737, Boeing 737M, Boeing 737 NG, E 175, and Q 400.

Aircraft may be manufactured by different manufacturers and/or be of different models or formats. Any of the aircraft described herein may be airliners, government aircraft operators, or military or defense aircraft operators.

Different types of aircraft may have different types of data or format of data that may be provided. For example, aircraft manufactured by a first manufacturer may provide different data or formats of data from an aircraft manufactured by a second manufacturer. In another example, aircraft owned and/or operated by a first airline may provide different data or formats of data from an aircraft owned and/or operated by a second airline. An aircraft management platform may be able to receive data from multiple data streams that may have the different types of data and/or formats of data and process them in a single system and allow for display for the data. Any description herein referring to how data may be managed with respect to aircraft faults may also be applied to any other type of aircraft data.

In some embodiments, the data may be in textual format. In some embodiments, the data may be in audio or video format. The data may be digital data. The data may be collected using a digital acquisition unit. The data may comply with the Flight Recorder Electronic Documentation (FRED) specification. The data may be provided as an Extensible Markup Language (XML) file, comma-separated values (CSV) file, Roofcon viewer project (RCV) file, or text document (TXT) file.

In an aspect, a method for monitoring recurrent aircraft faults may be provided. An aircraft fault may comprise one or more of a loose component, a cracked component, an elevated temperature, a malfunctioning component, an inoperative component, a missing component, or an unexpected noise. An aircraft fault may refer to any unexpected or undesired state with respect to an aircraft or component of the aircraft. An aircraft fault may refer to any type of deviation from a desired state or range of desired states for the aircraft or a component of the aircraft. An aircraft fault may recur if it occurs a particular number of times in a particular time period. For example, the recurrence may be greater than 1, 2, 3, 4, 5, 6, 7, 8, 9 10, 15, 20, 25, 30, 40, 50, 60, 70, 80, 90, or 100 times in a particular time period. The recurrence may be less than 3, 4, 5, 6, 7, 8, 9, 10, 15, 20, 25, 30, 40, 50, 60, 70, 80, 90, or 100 times in a particular time period. The time period may be within a minute, within two minutes, within three minutes, within five minutes, within 10 minutes, within 30 minutes, within an hour, within two hours, within 6 hours, within 12 hours, within a day, within a week, within ten days, within two weeks, within three weeks, within a month, within two months, within three months, within four months, within six months, within a year, within two years, within five years, or within a decade. For example, a recurrent fault may be classified as a fault occurring twice within ten days. An aircraft fault may recur if it occurs a particular number of times in a particular number of flights. For example, the recurrence may be greater than 1, 2, 3, 4, 5, 6, 7, 8, 9 10, 15, 20, 25, 30, 40, 50, 60, 70, 80, 90, or 100 times within a particular number of flights. The recurrence may be less than 3, 4, 5, 6, 7, 8, 9, 10, 15, 20, 25, 30, 40, 50, 60, 70, 80, 90, or 100 times within a particular number of flights. The particular number of flights may be greater than 1, 2, 5, 10, 15, 20, 25, 30, 40, 50, 60, 70, 80, 90, or 100 flights. The particular number of flights may be fewer than 2, 5, 10, 15, 20, 25, 30, 40, 50, 60, 70, 80, 90, or 100 flights.

The method comprises retrieving a plurality of data entries from an aircraft, the plurality of data entries comprising semantic information about a plurality of recurrent aircraft faults. The data entries may be from a pilot log. The entries may be from a maintenance log. The entries may be from aircraft fault sensors. The sensors may be pressure sensors, temperature sensors, force sensors, torque sensors, speed sensors, position and displacement sensors, level sensors, proximity sensors, multimeters, oscilloscopes, discharge probes, frequency generators, or other sensors. The entries may be text entries or audiovisual entries. The sensor entries may originate from a navigation system, such as an automatic dependent surveillance-broadcast (ADS-B), a pneumatic system, a hydraulic system, an engine system, or from another aircraft system.

The method may comprise next using a trained machine learning algorithm to establish a plurality of pairwise relations of the plurality of data entries, a pairwise relation corresponding to a recurrent fault of the plurality of recurrent aircraft faults.

Prior to using the trained machine learning algorithm, the system may perform pre-processing on the plurality of data entries. The preprocessing may be removing or replacing words or elements of words, standardizing entries, lemmatizing words (sorting by grouping inflected or variant forms of the same word), replacing words with synonyms, or other preprocessing.

The machine learning algorithm may be an algorithm such as a support vector machine (SVM), decision tree, or neural network. The neural network may be a convolutional neural network or a recurrent neural network. The machine learning algorithm may use deep learning. The deep learning algorithm may have 4, 16, 32, or 64 neural network layers. The machine learning algorithm may be a natural language processing (NLP) algorithm. The NLP algorithm may be a text classification algorithm. The NLP algorithm may extract semantic content from the data entries and make them into vectors. Then, a machine learning algorithm could determine matches between pairs of vectors. The machine learning algorithm may be trained over several epochs. The machine learning algorithm may be trained using a training set of multi-source aircraft fault data.

The method may then include generating one or more alerts from the pairwise relations. The alerts may be audiovisual or text alerts.

The method may then include displaying the alerts in an electronic report. The electronic report may be displayed in a graphical user interface. The alerts may be presented as charts. The alerts may be represented showing a horizontal axis with dates at the bottom and the alert displayed with a visual indicator, and the pair of alerts displayed on their respective dates.

FIG. 1 illustrates a system 100 for aggregating, processing, and displaying data from various sources, and generating recurrent faults for an aircraft operation, in accordance with an embodiment. The system 100 includes a plurality of data sources 110, a server 120, a user interface 150, and a user device 160.

The plurality of data sources 110 may extract fault data from an aircraft, e.g., a commercial aircraft, a government aircraft, or a defense aircraft. The data sources 110 may include maintenance logs 112 or information from a centralized fault display system (CFDS) 114. The maintenance logs 112 may be written by a pilot of the aircraft, by a technician, by another person, or automatically. The CFDS may receive information from built-in test equipment (BITE) aboard the aircraft. The BITE may include passive fault management and diagnosis equipment such as multimeters, oscilloscopes, discharge probes, frequency generators. When the BITE collect data regarding faults, they may automatically provide the information to the CFDS, which may produce a text output or readout of the faults. Optionally, data sources may comprise one or more sensors. The data sources may provide raw data or data that has been pre-processed. The data from the data sources 110 may be textual data or data that may be converted to textual data, such as image data or audio data. The data may be converted to a common format, such as text or any other format.

The server 120 may handle, store, and process data from the data sources 110 to generate recurrent faults. The server 120 may include data infrastructure 130 and machine learning sub-system 140. The data infrastructure 120 may include physical hardware for storing data from the data sources as well as network hardware and software for provisioning the data to other parts of the system 100. The physical hardware may be at a centralized location or may be distributed. For example, distributed physical hardware may comprise a cloud server. The data infrastructure 120 may implement one or more databases to facilitate access to and handling of data. The databases may be relational or non-relational databases, using query languages such as SQL and NoSQL, respectively. The data infrastructure may also perform pre-processing on the data to configure it for machine learning. For example, the data infrastructure 130 may compress the data or remove extraneous or duplicate data entries.

The machine learning sub-system 140 performs machine learning analysis on data from the data sources 140. The machine learning sub-system 140 may implement a data pipeline to pre-process data, store models, train models, validate models, and test models on data to generate predictions as to whether recurrent faults are present. Pre-processing the data may include generating one or more encodings or representations to combine or fuse the data from the maintenance log 112 and CFDS 114 to enable them to be processed by the machine learning algorithms. The machine learning sub-system 140 may store multiple machine learning models to use to generate predictions from the data sources 110. For example, the machine learning sub-system 140 may use a decision tree, neural network, support vector machine (SVM), logistic regression, or another type of model. The machine learning sub-system may use one or more natural language processing (NLP) or natural language understanding (NLU) algorithms to process the data from the data sources. The machine learning sub-system may train its models using training data with respect to particular ground truths. In some embodiments, a portion of the training data may be set aside for use as a validation set. After a particular number of training iterations, the machine learning sub-system may perform analysis on the validation set to determine whether enough epochs of training have been completed. When training has completed satisfactorily, the machine learning sub-system may test the data.

The algorithms described above may be supervised machine learning (ML) algorithms. A supervised ML algorithm can be trained using labeled training inputs, i.e., training inputs with known outputs. The training inputs can be provided to an untrained or partially trained version of the ML algorithm to generate a predicted output. The predicted output can be compared to the known output, and if there is a difference, the parameters of the ML algorithm can be updated. A semi-supervised ML algorithm can be trained using a large number of unlabeled training inputs and a small number of labeled training inputs.

The algorithms described herein may be neural networks. Neural networks may employ multiple layers of operations to predict one or more outputs, e.g., the identity of a pictured product. Neural networks can include one or more hidden layers situated between an input layer and an output layer. The output of each layer can be used as input to another layer, e.g., the next hidden layer or the output layer. Each layer of a neural network can specify one or more transformation operations to be performed on input to the layer. Such transformation operations may be referred to as neurons. The output of a particular neuron can be a weighted sum of the inputs to the neuron, adjusted with a bias and multiplied by an activation function, e.g., a rectified linear unit (ReLU) or a sigmoid function.

Training a neural network can involve providing inputs to the untrained neural network to generate predicted outputs, comparing the predicted outputs to expected outputs, and updating the algorithm's weights and biases to account for the difference between the predicted outputs and the expected outputs. Specifically, a cost function can be used to calculate a difference between the predicted outputs and the expected outputs. By computing the derivative of the cost function with respect to the weights and biases of the network, the weights and biases can be iteratively adjusted over multiple cycles to minimize the cost function. Training may be complete when the predicted outputs satisfy a convergence condition, e.g., a small magnitude of calculated cost as determined by the cost function.

The algorithms described above may be NLP algorithms. NLP algorithms may use statistical methods or may use neural networks. Neural networks used may include multi-layer perceptrons, convolutional neural networks (CNNs), recurrent neural networks (RNNs) (including long short-term memory networks (LSTMs)), sequence-to-sequence models, shallow neural networks, and deep neural networks, The NLP algorithms may use word embeddings to capture semantic properties of words within an aircraft log, maintenance log, or CFDS log.

The algorithms described may be decision tree algorithms. Decision tree algorithms may be classification or regression tree algorithms, or classification and regression tree (CART) algorithms. A classification tree may classify members of a set by splitting the set into subsets based on several dichotomous independent variables. Each subset may in turn be split an indefinite number of times until the splitting process terminates after a particular stopping criterion is reached.

One example decision tree model is a random forest model. Random forest models are ensemble machine learning models that can perform both regression and classification. Random forest models may merge predictions from multiple decision trees to achieve a more accurate and stable prediction than a single decision tree. Each decision tree in a random forest may learn from a random sample of training data. By training each tree on different samples, the random forest model may achieve low variance.

Other example decision tree algorithms may include Adaboost, XGBoost, gradient boosted trees, or bootstrap aggregated trees.

The user interface 150 may display aircraft faults or other types of aircraft data to one or more users. The user interface may be a graphical user interface (GUI), that may be accessed over a network (e.g., the Internet) using a web browser. The user interface 150 may display the recurrent faults predicted by the machine learning sub-system 140. The user interface 150 may be viewable on a user device 160. The user device may be a computing device, such as a desktop computer, laptop computer, smartphone, tablet computer, or personal digital assistant (PDA).

Figure 2:
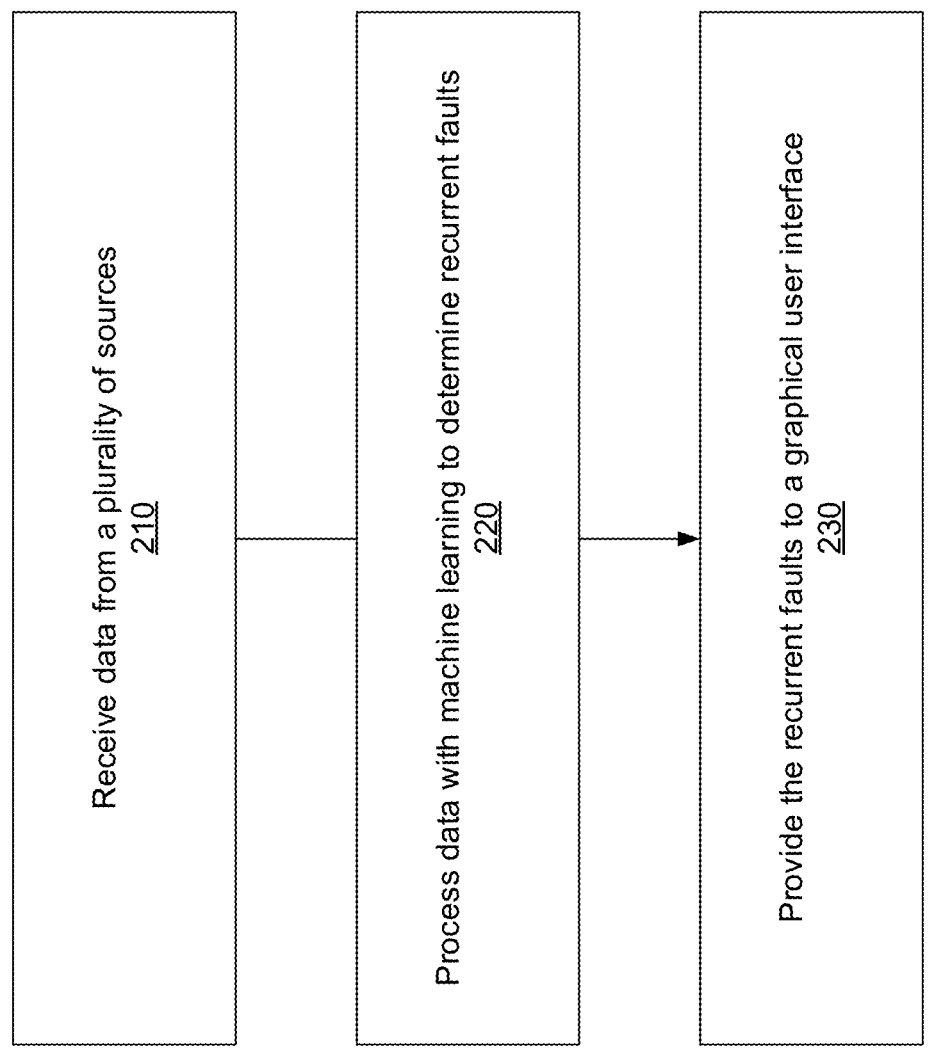
FIG. 2 illustrates a process for generating recurrent faults in an aircraft.

FIG. 2 illustrates a process 200 for generating recurrent faults in an aircraft.

In a first operation 210, the system receives data from multiple sources. The sources may include aircraft logs and centralized fault diagnosis system (CFDS) logs, providing text data entries. The sources may include "fault generation system" sensors from fault generating systems.

In a second operation 220, the system may process the data to determine recurrent faults. The system may perform pre-processing operations (e.g., combining the data from various sources by pooling or concatenating or compressing the data, or parsing the data). The system may standardize text from the data sources. The text standardization may include lemmatizing verbs and removing stop words. Standardization may include subject specific standardization (e.g., replacing abbreviations with full words, replacing variations of the same term). In another example, abbreviations may be replaced with full words. Variations of the same term may be replaced. For example, for particular terms that may be related, a standard term may be used to replace the variations. Irrelevant words may be removed. An "important words" dictionary may retain a list of words. In some instances, a lexicon or look-up table may be provided to identify words that may be variations on the same term or that may be replaced. Such sources may be updated periodically. In some embodiments, machine learning algorithms may be utilized to identify related words and/or determine word replacements. Similarly, format standardization may occur.

The system may then perform an intermediate step of establishing pair-wise relations between related log pages. Following establishing these relations, a graph algorithm may link these related pairs together. For two text entries to be related and "chronic-eligible," they may describe a problem of the same component type AND in the same position on the aircraft for components that are used in multiple parts of the plane. For example, a text entry with the defect description "FWD LAV TOILET NOT FLUSHING" may require another log page within 10 days describing an inoperative toilet specifically located in the front lavatory on the same aircraft to count as a recurrent fault. The system may determine from the text entries whether components in a pair of entries match, then whether the components are in the same location, and finally that the matching entries occur within enough time to be considered recurrent. The following list provides examples of component matching logic, which may be used alone or in combination in various embodiments.

Simple word matching—If certain keywords or regular expression (regex) patterns appear in a particular number of text entry instances within a particular time period, this may be labeled as a "preliminary" recurrent fault Text similarity calculation—Cosine similarities may be calculated on all text entries for the same plane during a particular period. If the similarity score is above a certain threshold, the two text entries may be counted as a match. In some embodiments, the system may use Jaccard similarity.

Encoded ATA matching—ATA is a code classifying an aircraft system, sub-system, or component. ATA codes may be written as ATA, ATA2, ATA3, ATA4, ATA5, ATA6, ATA7, ATA8, or other. ATA matches may be treated as preliminary recurrent fault pairs. For integration of faults into recurrent fault strings, the system may use this matching logic. The faults may have ATA coding. The system may generate a unique ID with aircraft ID, a fault level key, and date that follows the same formula as a log page's unique.

Supervised learning matching—if predicted ATA or predicted component removal matches, the system may log a preliminary recurrent fault match. A cleaned deficit description text may be fit on a term frequency-inverse document frequency (tf-idf) matrix, which may then be used to predict the different classes of ATA or component removals. This may be performed using a random forest algorithm.

Once the components are confirmed as matches, any position identifiers may be extracted. This step may depend on the specific use case. For example, for engine-related components, position indicators may be left or right, or engine one or engine two. For lavatories, position indicators may be any combination of forward, mid, and aft.

A script may process text entry data into recurrent fault alerts and may output the two tables for a user interface. The script may be run periodically when new data is received. After the pairwise relations between log entries are formed, a graph algorithm may link related pairs together.

To create recurrent faults from a combination of log entries and CFDS pages, the system may simply use the unique ID values of the corresponding faults or sensor data alerts and connect them to relevant log pages. Combining faults with log pages may enable aircraft faults, problems, or issues to be addressed quickly, as particular problems may appear as aircraft communication addressing and reporting system (ACARS) faults before being recorded by a pilot or by maintenance personnel. To create recurrent faults from CFDS, the system may perform text matching with the message description, use the ATA that is provided as a parameter, or use a combination of both. Sensor data faults could also be incorporated by ATA. Or, the system may also impute a text description of the fault to match against log page data.

In a third operation 230, the system may provide the recurrent faults to a graphical user interface. The linked pairs may be provided as fault sequences as input data to a function used to create tables presenting the faults to users. The tables may then be displayed in the graphical user interface. The tables may be updated continuously or periodically when new data is available.

An aircraft management platform may comprise a display that may be useful for showing relevant information to a user. One or more displays may be provided to permit one or more users to view the relevant information. A user may be a pilot, an employee of an airline, an individual associated with operation, maintenance, or management of the aircraft, a government aircraft operator, a defense aircraft operator, or any other individual who may be authorized to access aircraft information. A user interface may be provided on a display to provide aircraft data and/or permit user interaction with the data.

Figure 3:
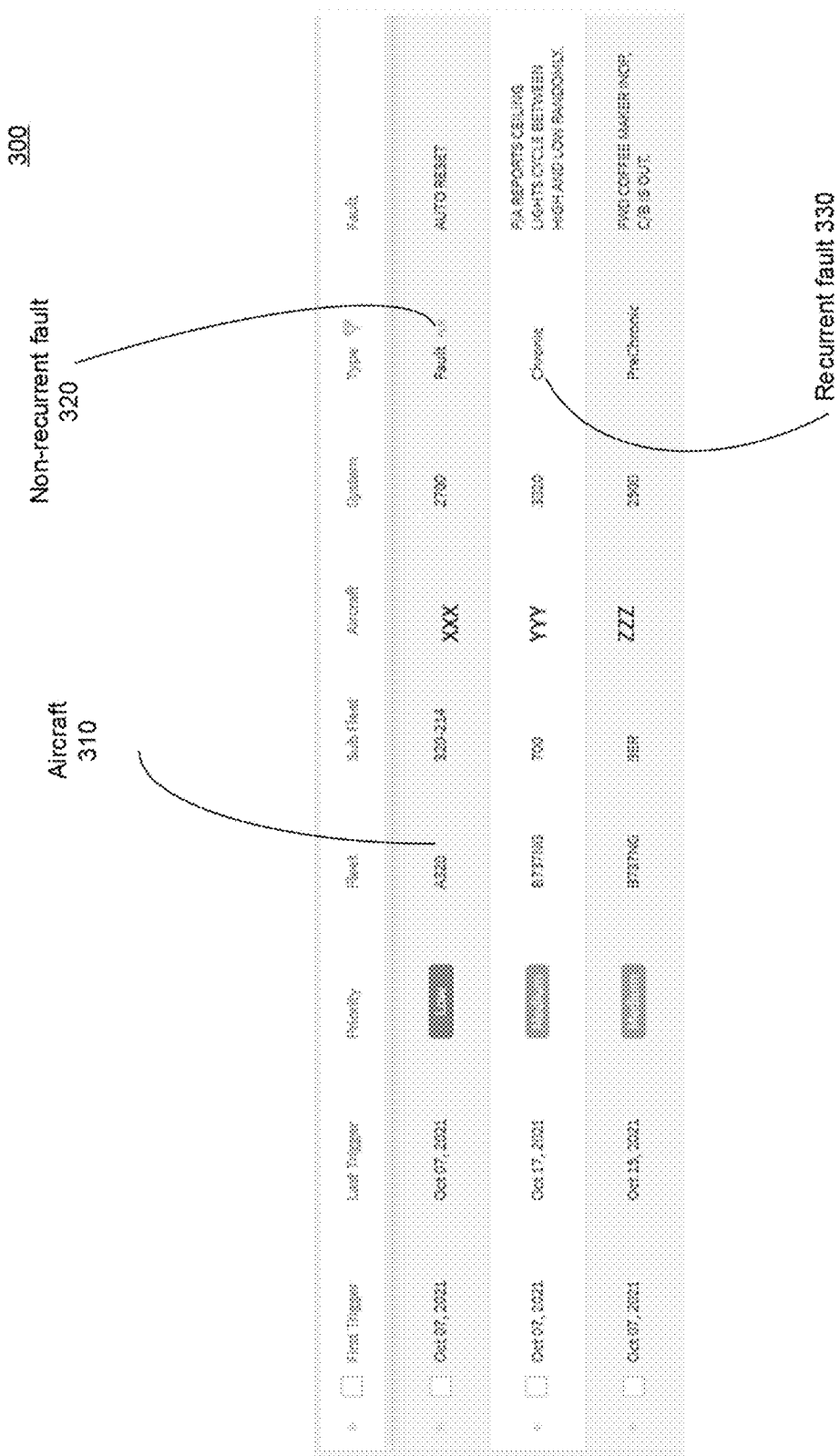
FIG. 3 illustrates a user interface, in accordance with an embodiment.

FIG. 3 illustrates a user interface 300, in accordance with an embodiment. The user interface 300 displays information about faults associated with various aircraft 310. The user interface displays both non-recurrent faults 320 and recurrent faults 330. The recurrent faults may have been detected using a machine learning algorithm, such as from machine learning sub-system 140.

Figure 5:
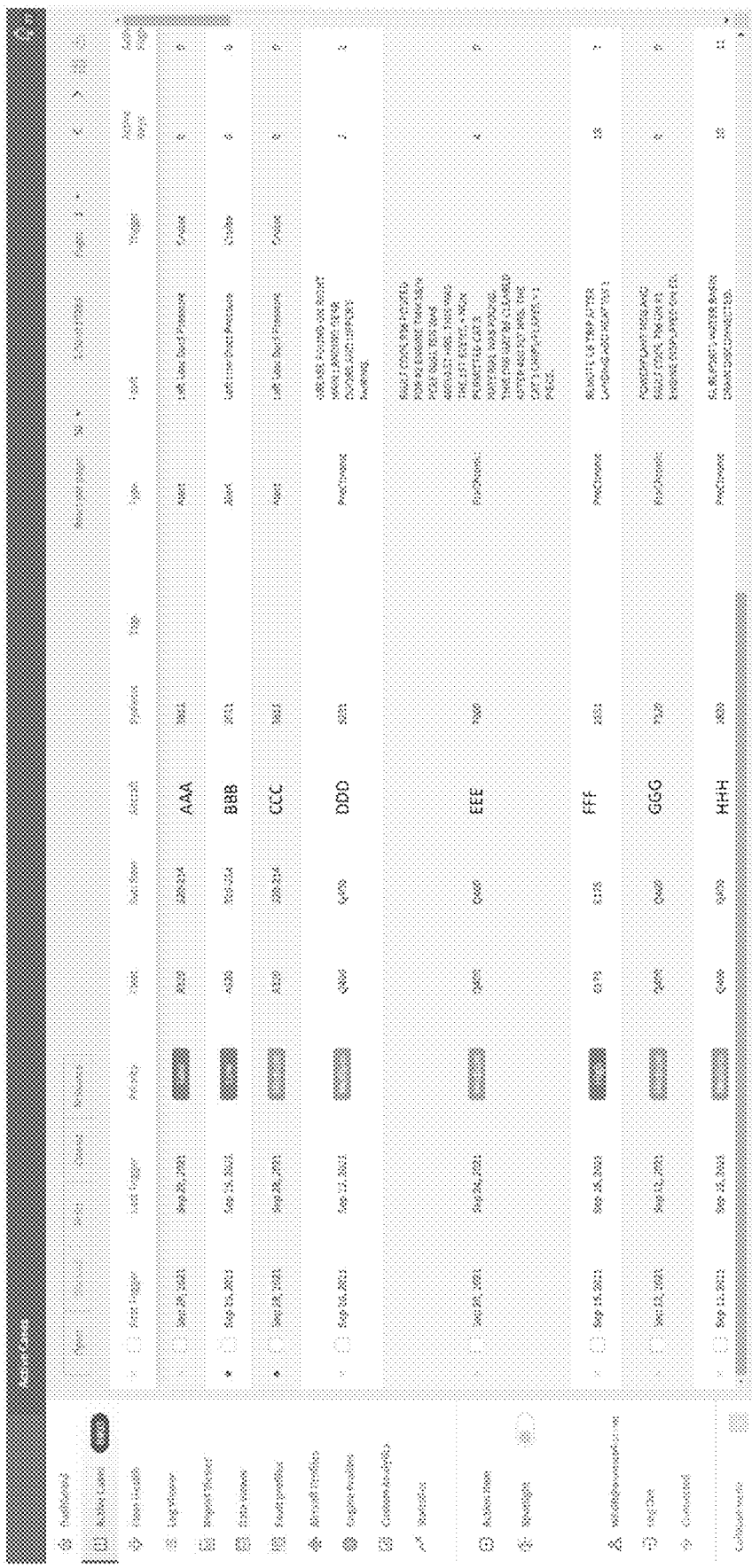
FIG. 5 illustrates an exemplary user interface showing active cases, in accordance with an embodiment.

FIG. 5 illustrates an exemplary user interface showing active cases, in accordance with an embodiment of the invention. The active cases may be provided as a list. In some embodiments, a priority may be associated with the active case. In some instances, one or more categories of priority may be provided, such as "high", "medium" or "low." In some instances, one or more numerical value may be associated to indicate level of priority. The priority level may be visually displayed, and a user may optionally be able to sort by priority level.

Optionally, the user interface showing active cases may show additional data about the cases, such as first trigger, last trigger, fleet, subfleet, aircraft, systems, tags, type, fault, trigger, active days, active flights, and so forth. In some instances, the cases may be filtered or sorted by any of the additional data.

Figure 6:
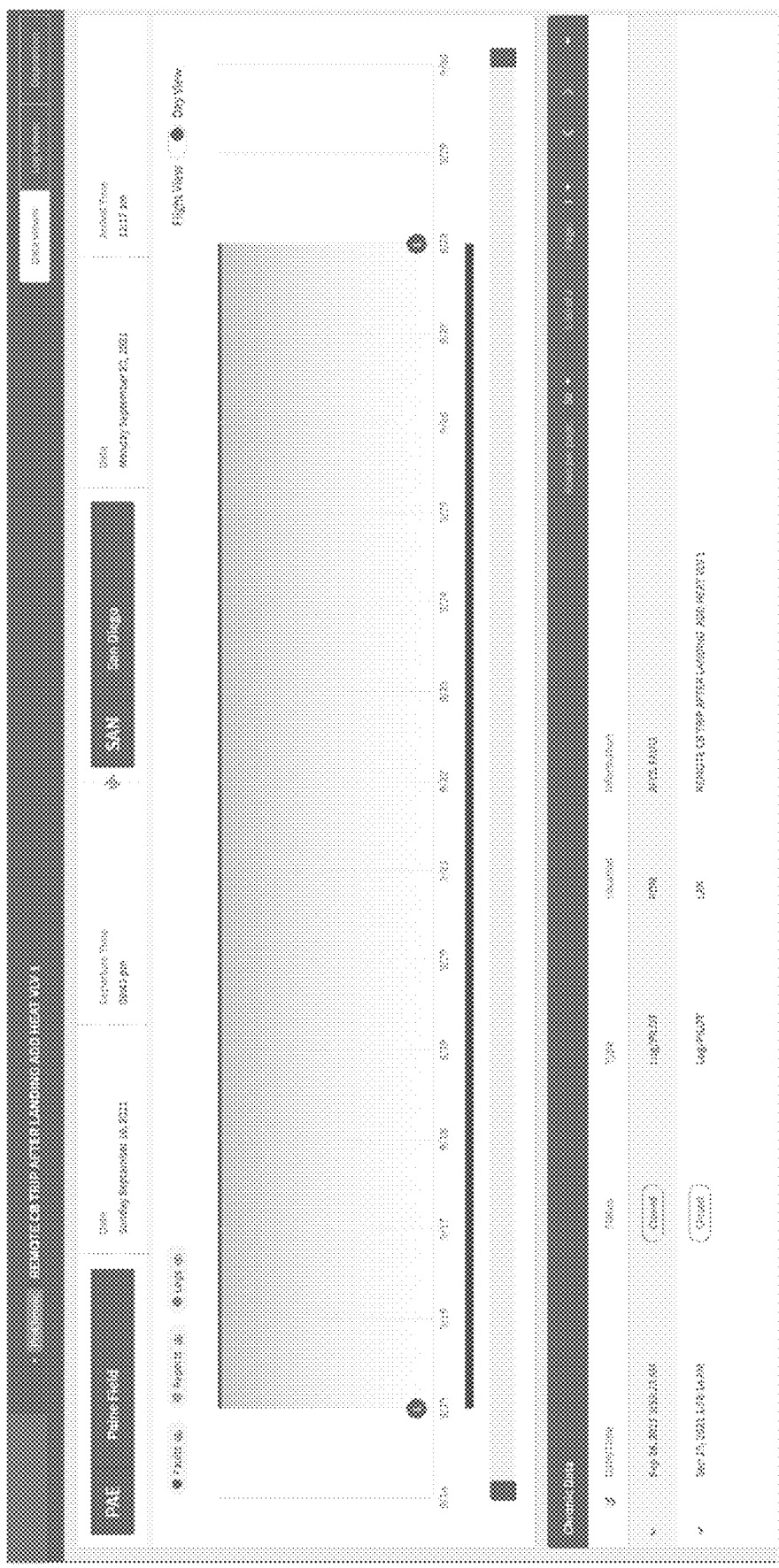
FIG. 6 illustrates an exemplary user interface showing details about an active case, in accordance with an embodiment.

FIG. 6 illustrates an exemplary user interface showing details about an active case, in accordance with an embodiment of the invention. Selecting an active case from a list of active cases may allow additional details about the selected case to be displayed. In some embodiments, a timeline or similar time-dependent graphical display may be provided. The graphical display may show a state of a component over time or how long a fault has been occurring or in effect. The graphical display may advantageously permit a user to quickly view the graphic and understand the timing of the fault and/or potential severity. Additional data, such as chronic data may be accessible.

Figure 7:
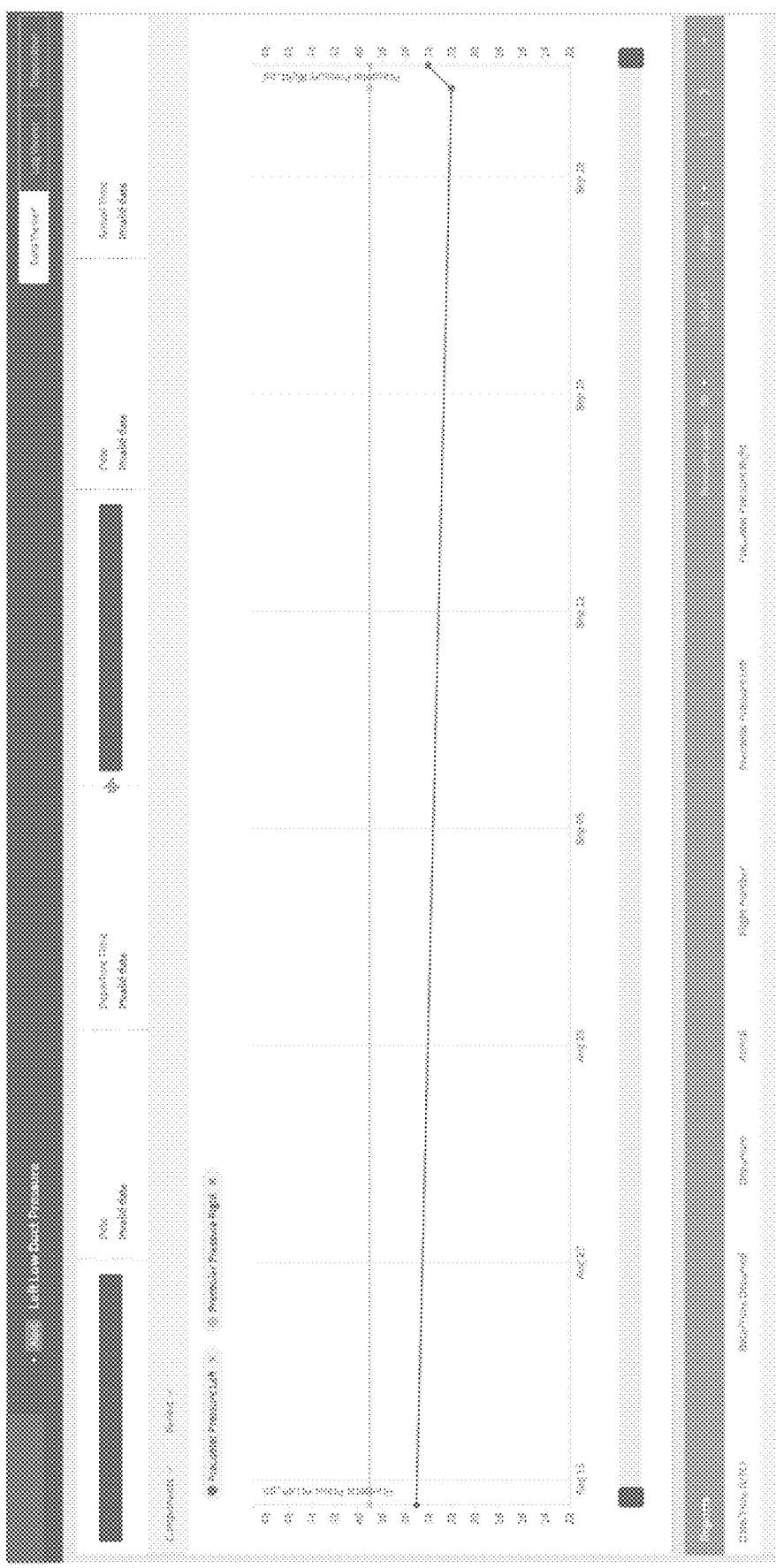
FIG. 7 illustrates another exemplary user interface showing details about an active case, in accordance with an embodiment.

FIG. 7 illustrates another exemplary user interface showing details about an active case, in accordance with an embodiment of the invention. As previously described a time-dependent graphical display may be provided. A status of the aircraft or one or more component of the aircraft over time may be displayed. For example, precooler pressure for the right side and the left side may be displayed over time.

Figure 8:
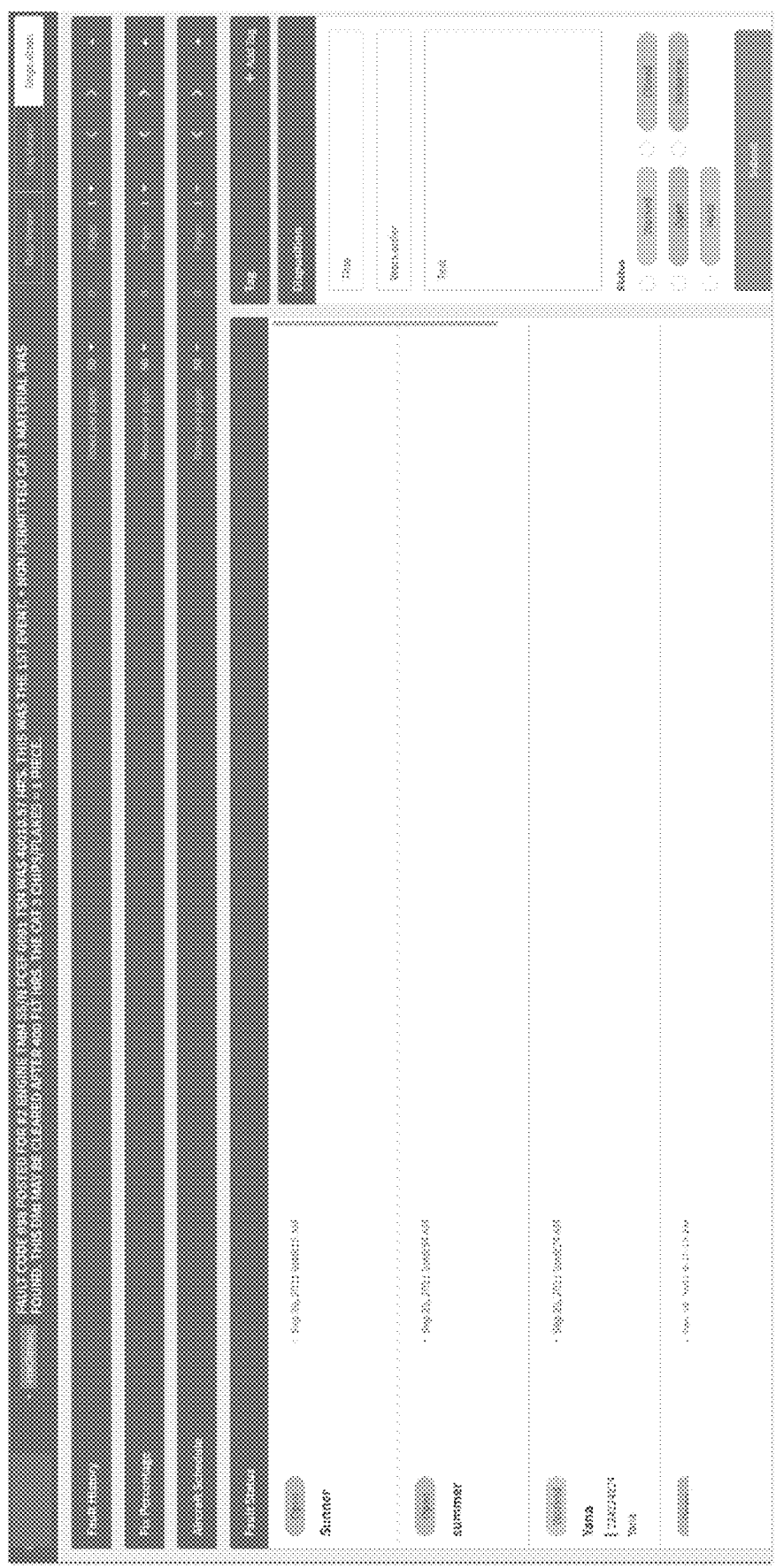
FIG. 8 illustrates an exemplary user interface showing details relating to a disposition of a case, in accordance with an embodiment.

FIG. 8 illustrates an exemplary user interface showing details relating to a disposition of a case, in accordance with an embodiment with an embodiment of the invention. The user interface may show data such as fault history, fix percentage, aircraft schedule and/or fault status. The fault status may show the status for the fault in a visually apparent way, such as with colors or labels. Examples of fault status that may be displayed may include open, closed, worked, nuisance, or hold. The user interface may enable an aircraft operator to upload a log file to be tracked in the aircraft operator's database, to enable authorized users to view the disposition of the case.

Figure 9:
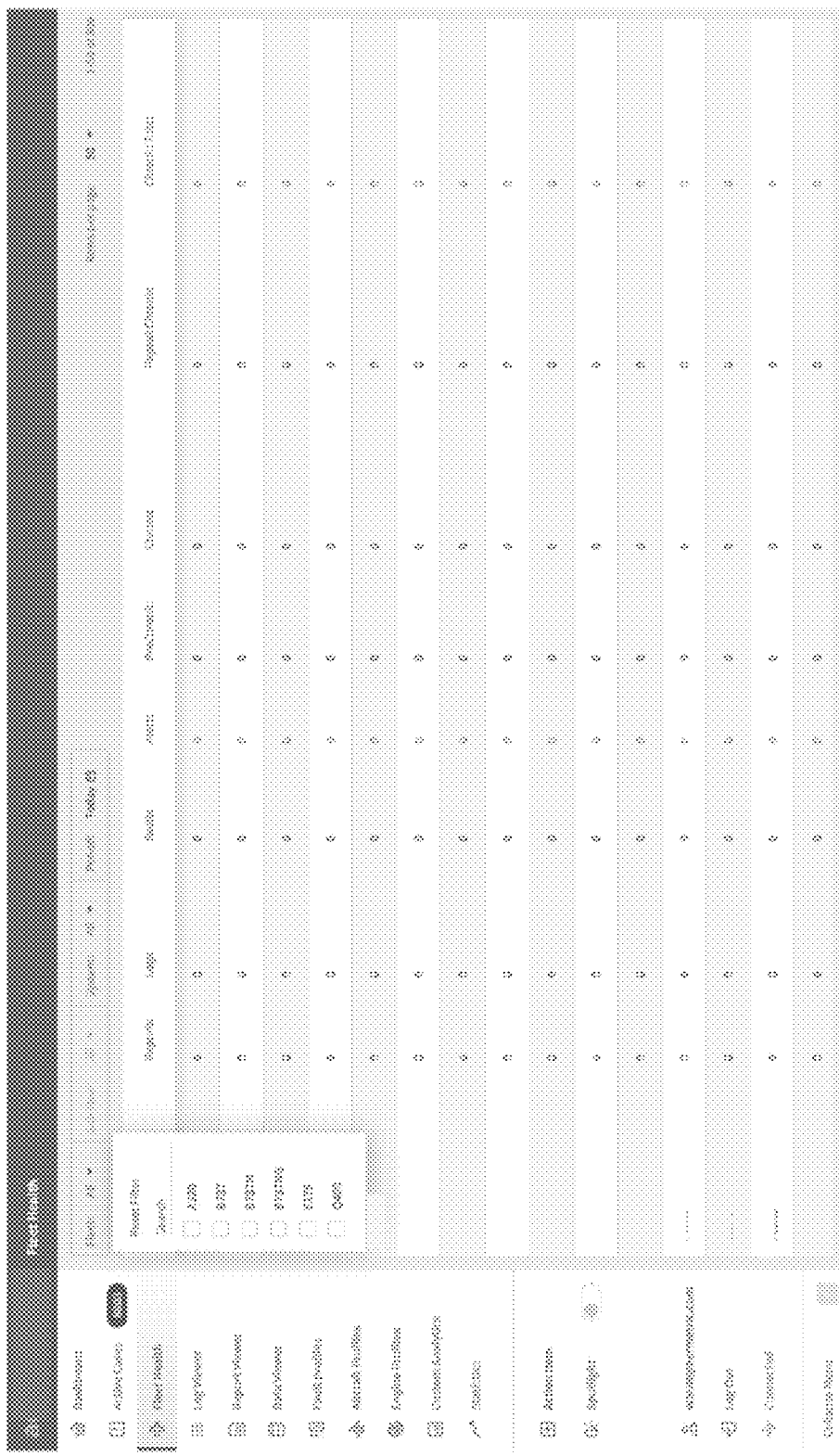
FIG. 9 illustrates an exemplary user interface showing fleet health, in accordance with an embodiment.

FIG. 9 illustrates an exemplary user interface showing fleet health, in accordance with an embodiment of the invention. A fleet health page may include a list of aircraft and/or details about each aircraft pertaining to health, such as, reports, logs, faults, alerts, prechronic, chronic, repeat chronic, and chronic total. In some instances, pre-chronic may refer to a detected fault that is not yet chronic but is flagged early enough to signal that it may become a chronic defect. The criteria for a defect to be considered a chronic defect may be defined by the aircraft operator. By having a number associated with the various details pertaining to health, a user may be able to determine, with a quick glance, which aircraft seem to have more health issues.

Figure 10:
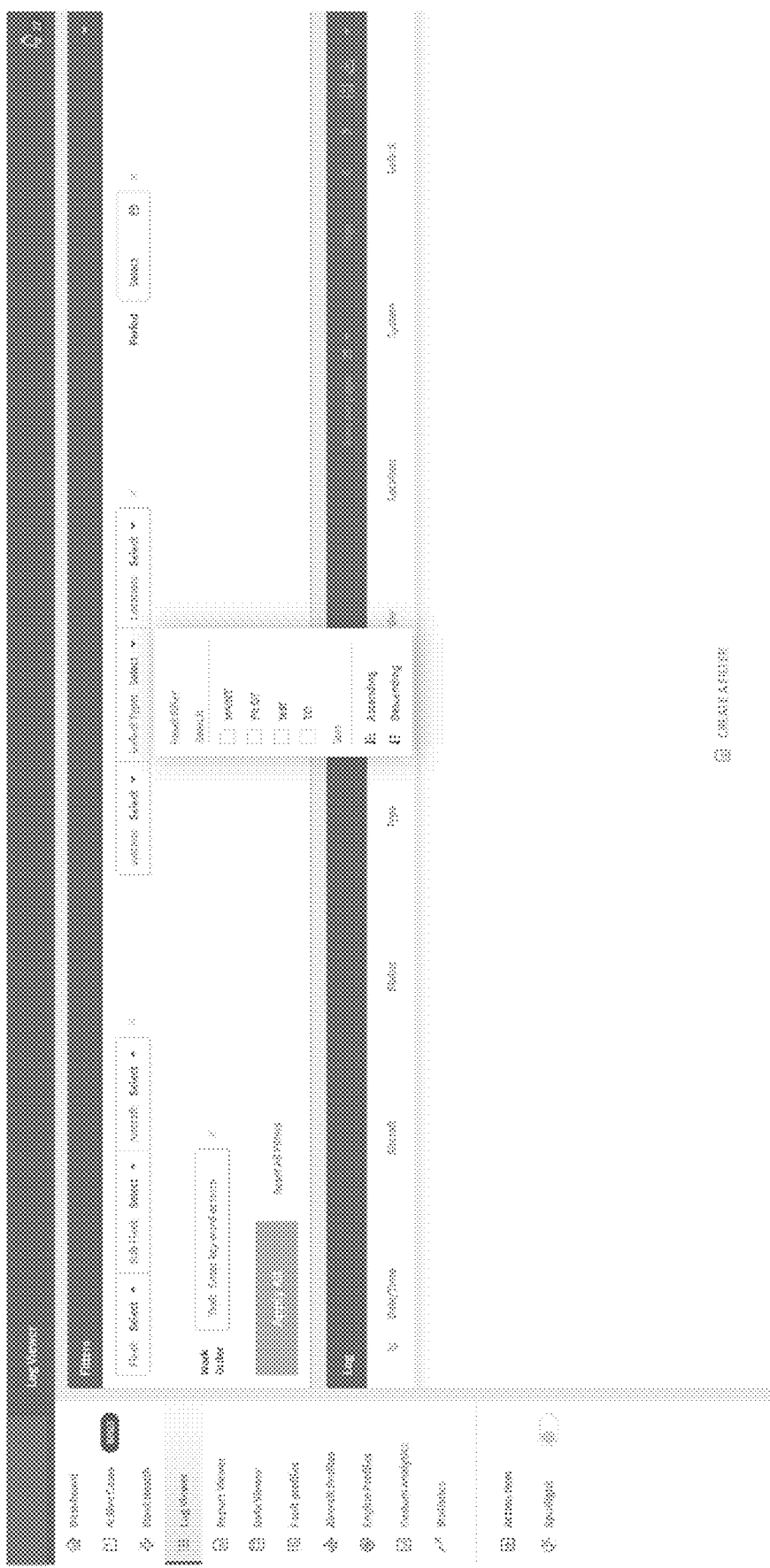
FIG. 10 illustrates an exemplary user interface showing a log viewer, in accordance with an embodiment.

FIG. 10 illustrates an exemplary user interface showing a log viewer, in accordance with an embodiment of the invention. Logs associated with various aircraft may be displayed. The logs may be filtered based on one or more parameters, such as fleet, subfleet or aircraft. In some instances, the logs may be filtered based on system, defect type, and/or location. Similarly, the log may be filtered by time; a user may be able to select a time period for the log.

Figure 11:
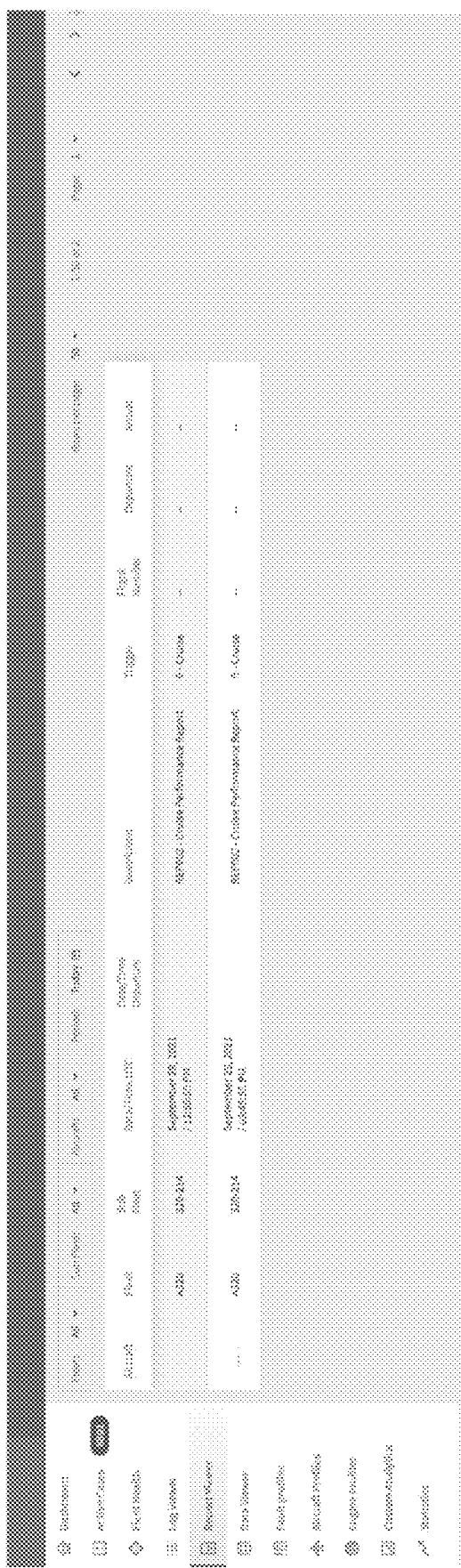
FIG. 11 illustrates an exemplary user interface showing a report viewer, in accordance with an embodiment.

FIG. 11 illustrates an exemplary user interface showing a report viewer, in accordance with an embodiment of the invention. One or more report for an aircraft may be listed. A user may select the report for further details. Information about the aircraft, fleet, subfleet, date/time, description, trigger, flight number, departure, and/or arrival may be provided for the report. In some embodiments, the report may be filtered by one or more parameter, such as fleet, subfleet, aircraft, and/or associated time period.

Figure 12:
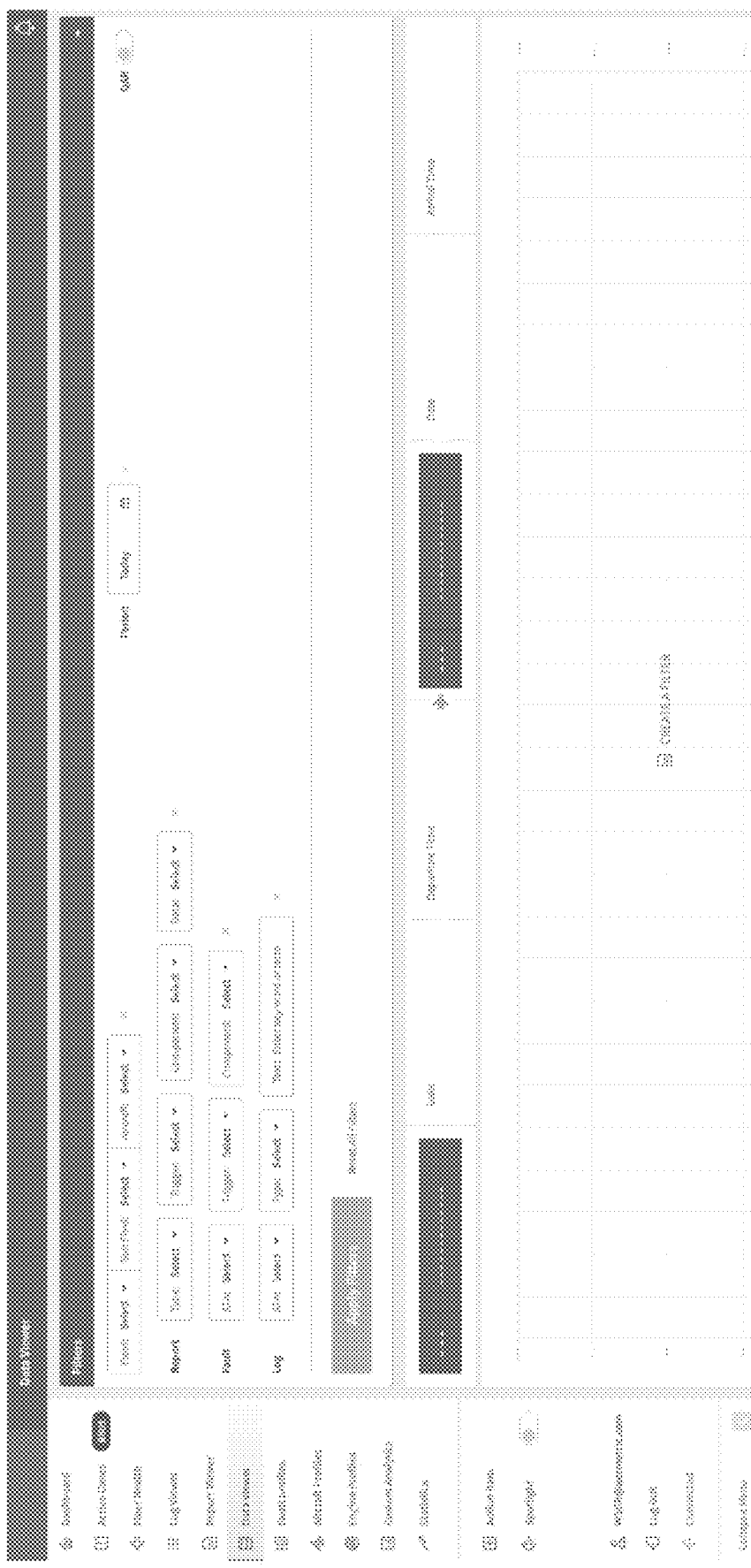
FIG. 12 illustrates an exemplary user interface showing a data viewer, in accordance with an embodiment.

FIG. 12 illustrates an exemplary user interface showing a data viewer, in accordance with an embodiment of the invention. One or more filters may be applied to the data viewer. Examples of such filters may include fleet, subfleet, and/or aircraft. A filter may be provided for a report by type, trigger, component, and/or data. In some embodiments, a filter may be provided for a fault by ATA, trigger, or component. A filter may for a log may be provided by ATA, type, or a search term (e.g., type text keyword). The user interface also may enable overlays of a plurality of systems. For example, the user interface may display data from multiple systems superimposed on a common chart, graph, table, list, or plot.

Any description herein of a filter or parameter may be applied individually to each filter or parameter. In some embodiments, combinations of filters and/or parameters may be used in order to determine the data to display. For example, if a fleet is selected and a fault type are selected, only reports pertaining to aircraft within the selected fleet and with the selected fault type may be displayed.

A user interface may show additional data such as fault profiles, aircraft profiles, engine profiles, custom analytics and/or statistics.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Computer Systems

Figure 4:
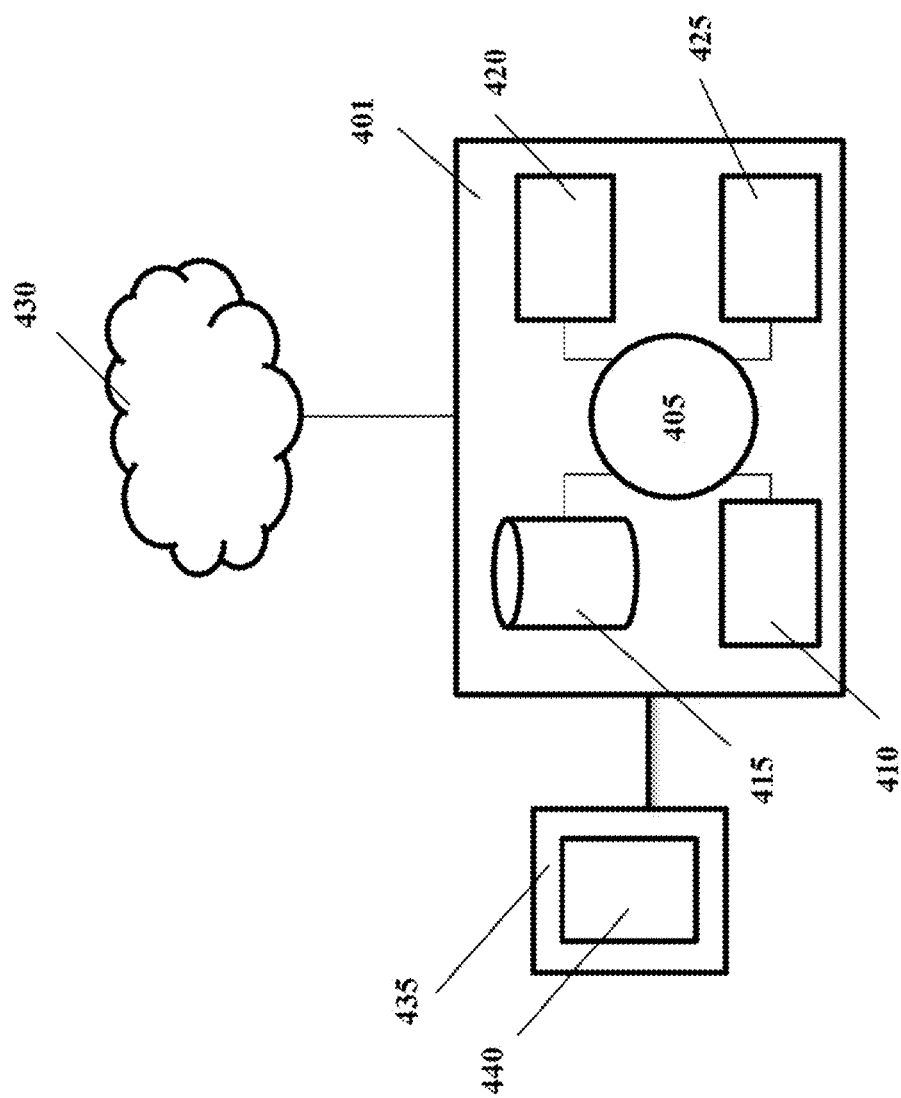
FIG. 4 shows a computer system that is programmed or otherwise configured to implement methods provided herein.

The present disclosure provides computer systems that are programmed to implement methods of the disclosure. FIG. 4 shows a computer system 401 that is programmed or otherwise configured to implement machine learning algorithms to generate recurrent faults. The computer system 401 can regulate various aspects of recurrent fault generation of the present disclosure, such as, for example, component matching. The computer system 401 can be an electronic device of a user or a computer system that is remotely located with respect to the electronic device. The electronic device can be a mobile electronic device.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user (e.g., a mobile device). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440 for providing, for example, displaying non-recurrent and recurrent faults. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, generate recurrent faults.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for monitoring recurrent aircraft faults, comprising:
    (a) retrieving a plurality of data entries from an aircraft, the plurality of data entries comprising semantic information about a plurality of recurrent aircraft faults;
    (b) using a trained machine learning algorithm, establishing a plurality of pairwise relations of the plurality of data entries, a pairwise relation corresponding to a recurrent fault of the plurality of recurrent aircraft faults, wherein a pairwise relation comprises at least two fault occurrences associated with an aircraft component within a period, wherein the at least two fault occurrences are at one location of the aircraft, wherein the plurality of data entries is derived from one or more of maintenance logs, pilot reports, or centralized fault diagnosis system (CFDS) data;
    (c) generating one or more alerts from the plurality of pairwise relations; and
    (d) presenting the one or more alerts in a user interface.

2. The method of claim 1, wherein the data entries are streaming data, data from flat files, batched files, or data from a one time data transfer.

3. The method of claim 1, wherein the data entries are aircraft maintenance data or aircraft operations data.

4. The method of claim 1, wherein the recurrent fault occurs a particular number of times within a particular number of flights.

5. The method of claim 1, wherein the aircraft is a passenger plane, jumbo jet, cargo plane, military plane, or government plane.

6. The method of claim 1, wherein an aircraft fault is a loose component, a cracked component, an elevated temperature, a malfunctioning component, an inoperative component, a missing component, or an unexpected noise.

7. The method of claim 1, wherein the machine learning algorithm may be a support vector machine, a decision tree, a neural network, or a natural language processing algorithm.

8. The method of claim 1, wherein the user interface is a graphical user interface.

9. The method of claim 1, further comprising, prior to (b), pre-processing the plurality of data entries.

10. The method of claim 9, wherein pre-processing the plurality of data entries comprises combining data, compressing data, or parsing data.

11. The method of claim 9, wherein pre-processing the plurality of data entries comprises standardizing text.

12. The method of claim 11, wherein text standardization comprising lemmatizing verbs, removing stop words, or subject-specific standardization.

13. The method of claim 1, wherein generating a pairwise relation comprises using one or more of simple word matching, text similarity calculation, encoded ATA matching, or supervised learning matching.

14. A computer-implemented method of training a machine learning model for detecting recurrent aircraft faults, comprising:
    (a) receiving data from one or more sources, the one or more sources comprising maintenance logs, pilot reports, or centralized fault diagnosis system (CFDS) data;
    (b) applying one or more pre-processing operations to the data, wherein the one or more pre-processing operations comprises one or more of: combining the data, compressing the data, parsing the data, or standardizing the data to create pre-processed data;
    (c) creating a training set comprising a plurality of pairwise relations associated with the pre-processed data, wherein a pairwise relation comprises at least two fault occurrences associated with an aircraft component within a period, wherein the at least two fault occurrences are at one location of the aircraft; and
    (d) training the machine learning model to link a pair of the plurality of pairwise relations.

15. The method of claim 14, wherein the data comprises a plurality of text entries.

16. The method of claim 15, wherein (b) further comprises using one or more machine learning algorithms to (1) replace one or more words in one or more of the text entries; or (2) identify related words in one or more of the text entries.

17. A system for monitoring recurrent aircraft faults, comprising:
    one or more computer processors individually or collectively programmed to:
    (a) retrieve a plurality of data entries from an aircraft, the plurality of data entries comprising semantic information about a plurality of recurrent aircraft faults;
    (b) use a trained machine learning algorithm, establishing a plurality of pairwise relations of the plurality of data entries, a pairwise relation corresponding to a recurrent fault of the plurality of recurrent aircraft faults, wherein a pairwise relation comprises at least two fault occurrences associated with an aircraft component within a period, wherein the at least two fault occurrences are at one location of the aircraft, wherein the plurality of data entries is derived from one or more of maintenance logs, pilot reports, or centralized fault diagnosis system (CFDS) data;
    (c) generate one or more alerts from the plurality of pairwise relations; and
    (d) present the one or more alerts in a user interface.

18. A non-transitory computer-readable medium comprising machine-executable code that, upon execution by one or more computer processors, implements a method for monitoring recurring aircraft faults, the method comprising:

(a) retrieving a plurality of data entries from an aircraft, the plurality of data entries comprising semantic information about a plurality of recurrent aircraft faults;
(b) using a trained machine learning algorithm, establishing a plurality of pairwise relations of the plurality of data entries, a pairwise relation corresponding to a recurrent fault of the plurality of recurrent aircraft faults, wherein a pairwise relation comprises at least two fault occurrences associated with an aircraft component within a period, wherein the at least two fault occurrences are at one location of the aircraft, wherein the plurality of data entries is derived from one or more of maintenance logs, pilot reports, or centralized fault diagnosis system (CFDS) data;
(c) generating one or more alerts from the plurality of pairwise relations; and
(d) presenting the one or more alerts in a user interface.

\* \* \* \* \*